(12) United States Patent
Shukla et al.

(10) Patent No.: US 10,439,968 B2
(45) Date of Patent: Oct. 8, 2019

(54) ACTIVITY NOTIFICATION SYSTEM

(71) Applicant: Microsoft Technology Licensing, LLC, Redmond, WA (US)

(72) Inventors: Manish Kumar Shukla, Lexington, MA (US); Andrew W. Harris, Somerville, MA (US); Candy Hoi Mei Wong, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 15/142,017

(22) Filed: Apr. 29, 2016

(65) Prior Publication Data

US 2017/0214643 A1    Jul. 27, 2017

Related U.S. Application Data

(60) Provisional application No. 62/287,541, filed on Jan. 27, 2016.

(51) Int. Cl.
*H04L 12/58* (2006.01)
*H04L 29/08* (2006.01)
*G06F 17/24* (2006.01)
*G06Q 10/10* (2012.01)

(52) U.S. Cl.
CPC .............. *H04L 51/10* (2013.01); *G06F 17/24* (2013.01); *G06Q 10/10* (2013.01); *G06Q 10/101* (2013.01); *H04L 51/24* (2013.01); *H04L 67/02* (2013.01); *H04L 67/26* (2013.01)

(58) Field of Classification Search
None
See application file for complete search history.

(56) References Cited

U.S. PATENT DOCUMENTS

| 8,892,679 | B1 | 11/2014 | Destagnol et al. |
| 9,208,153 | B1 | 12/2015 | Zaveri et al. |
| 2004/0003352 | A1 | 1/2004 | Bargeron et al. |
| 2008/0301228 | A1 | 12/2008 | Flavin |

(Continued)

OTHER PUBLICATIONS

"International Search Report and Written Opinion Issued in PCT Application No. PCT/US2017/013628", dated May 18, 2017, 22 Pages.

(Continued)

*Primary Examiner* — Lance Leonard Barry
*Assistant Examiner* — Mohammad Yousuf A. Mian

(57) ABSTRACT

Aspects of the present disclosure relate to an activity notification system. In one aspect, one or more entities associated with a user of a file may be identified. A priority level may be assigned to each of the one or more entities based on a type of activity of one or more activities associated with the file. The priority level may include at least a highest priority level and a lowest priority level. A notification indicating an occurrence of at least one activity from the one or more activities associated with the file may be sent to the entity of the one or more identified entities assigned the highest priority level. It may be determined which activities of one or more activities received at a notification service meet a notification value threshold. At least one notification from the activities determined to meet the notification value threshold may be generated.

20 Claims, 5 Drawing Sheets

(56) References Cited

U.S. PATENT DOCUMENTS

| | | | |
|---|---|---|---|
| 2012/0084606 A1* | 4/2012 | Igarashi | G03G 15/5079 714/37 |
| 2012/0150942 A1 | 6/2012 | Alev et al. | |
| 2013/0013560 A1* | 1/2013 | Goldberg | G06Q 10/101 707/634 |
| 2013/0049950 A1* | 2/2013 | Wohlert | H04M 11/04 340/531 |
| 2013/0173532 A1 | 7/2013 | Xie | |
| 2014/0250058 A1 | 9/2014 | Thiruvidan et al. | |
| 2014/0281870 A1 | 9/2014 | Vogel et al. | |
| 2014/0281872 A1 | 9/2014 | Glover | |
| 2014/0372852 A1 | 12/2014 | Rothschiller et al. | |
| 2015/0006642 A1 | 1/2015 | Viitala et al. | |
| 2015/0134817 A1* | 5/2015 | Edwards | H04L 47/70 709/225 |
| 2015/0143263 A1 | 5/2015 | Parker et al. | |
| 2015/0193492 A1 | 7/2015 | Gunaratne et al. | |
| 2015/0277724 A1 | 10/2015 | Masterson et al. | |
| 2015/0358201 A1* | 12/2015 | Park | H04L 41/0813 715/735 |
| 2015/0370827 A1 | 12/2015 | Parkison et al. | |
| 2016/0036822 A1* | 2/2016 | Kim | H04L 67/1097 726/4 |
| 2016/0308940 A1* | 10/2016 | Procopio | G06F 17/30144 |

OTHER PUBLICATIONS

"Collaborate with confidence", Published on: Aug. 2013 Available at: http://www8.hp.com/us/en/pdf/4AA4-3308ENW_Rev2_lo-res_tcm_245_1489429.pdf.

"Cloud Storage", Published on: Apr. 27, 2013 Available at: http://www.baylor.edu/business/mis/nonprofits/doc.php/197132.pdf.

"Collaborate . . . Anywhere", Published on: Apr. 3, 2015 Available at: http://www.bluebeam.com/au/products/revu/bluebeam-studio.asp.

"Google Docs: Share and collaborate", Published on: Jan. 26, 2012 Available at: https://www.wju/edu/its/GoogleAppsTutorial/sharecollaborate.pdf.

Etter, et al., "A Rule-Based Approach towards Context-Aware User Notification Services", In ACS/IEEE International Conference on Pervasive Services, Jun. 26, 2006, 4 pages.

\* cited by examiner

ACTIVITY NOTIFICATION SYSTEM

RELATED APPLICATIONS

This application claims the benefit of and priority to U.S. Provisional Patent Application No. 62/287,541, filed on Jan. 27, 2016, and entitled, "ACTIVITY NOTIFICATION SYSTEM," which is hereby incorporated by reference in its entirety.

BACKGROUND

Computer and software users have grown accustomed to user-friendly software applications for co-authoring files, documents, messages, and the like. For example, storage providers (e.g., cloud storage providers) provide applications such as word processing applications, spreadsheet applications, electronic slide presentation applications, email applications, chat applications, voice applications, and the like, where users can co-author and collaborate with one another within the applications. Current entities and/or storage providers that provide collaboration experiences require that applications, files, and/or metadata about the applications and/or files be stored on the entity's service and/or storage itself. That is, the file contents and the metadata about the file are both stored in the same location and tied to the entity service and/or storage provider. Notifications may be used to alert users about changes made to the documents by another user and/or co-author. However, the notifications regarding document changes are provided by the same entity service and/or storage provider that stores the document itself.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to a notification system for activities surrounding files. In one aspect, one or more entities associated with a user of a file may be identified. A priority level may be assigned to each of the one or more entities based on a type of activity of one or more activities associated with the file. The priority level may include at least a highest priority level and a lowest priority level. A notification indicating an occurrence of at least one activity from the one or more activities associated with the file may be sent to the entity of the one or more identified entities assigned the highest priority level.

In another aspect, one or more activities associated with a file may be received. It may be determined which activities of the one or more activities meet a notification value threshold. At least one notification from the activities determined to meet the notification value threshold may be generated.

In yet another aspect, one or more activities associated with a file stored on a first storage platform may be received. A first notification from the one or more activities associated with the file stored on the first storage platform may be generated for alerting a user of the file of an occurrence of at least one of the one or more activities associated with the file. One or more activities associated with another file stored on a second storage platform may be received. A second notification from the one or more activities associated with the another file stored on the second storage platform may be generated for alerting a user of the another file of an occurrence of at least one of the one or more activities associated with the another file.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
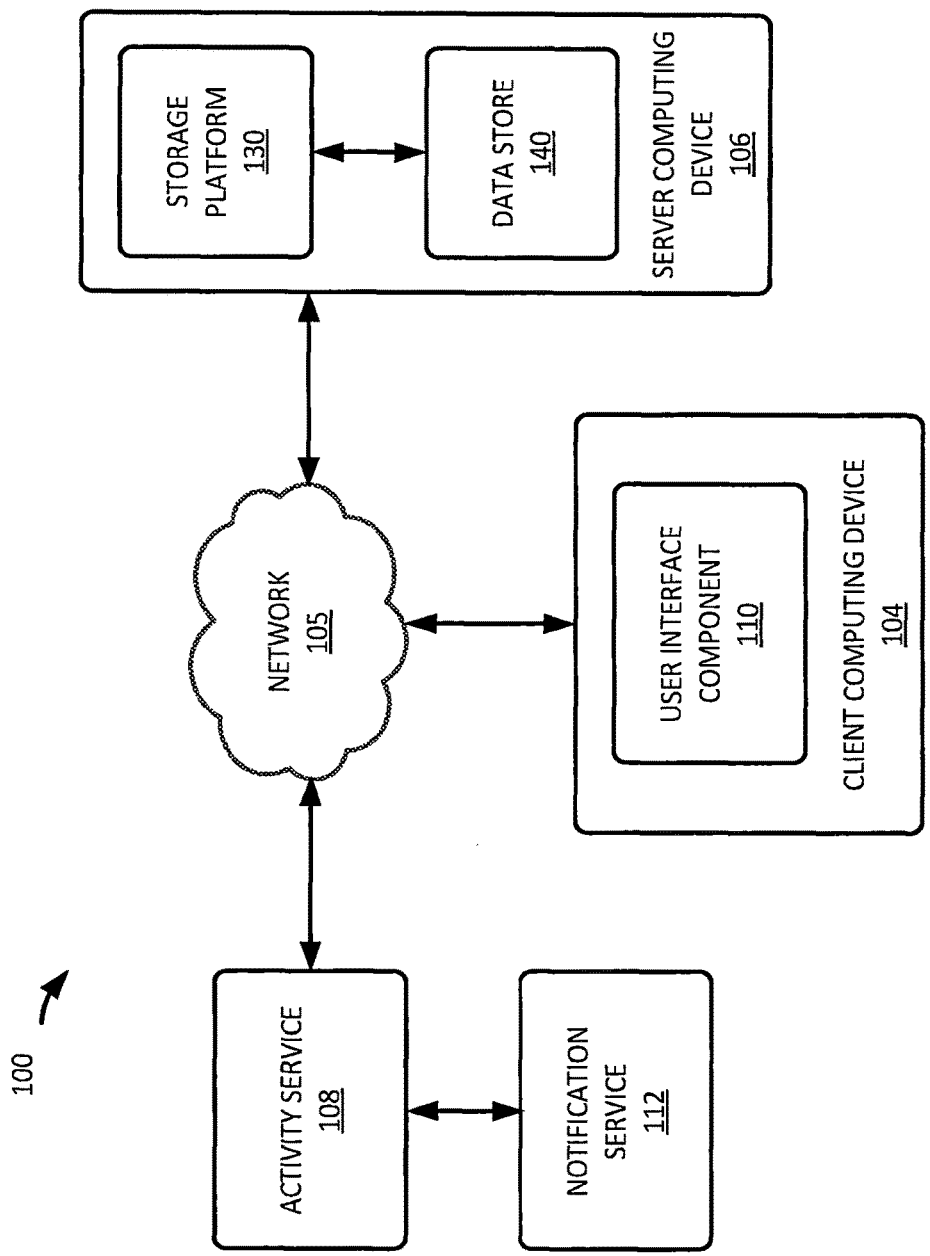
FIG. 1 illustrates an exemplary notification system, according to an example aspect.

Aspects of the disclosure are generally directed to an activity notification system for generating notifications from one or more activities associated with a file. For example, the activity notification system may be configured to generate notifications from one or more activities associated with a file and identify one or more entities to which the notifications should be sent such that a plurality of entities may receive activity notifications from a notification service. In some examples, activities associated with the file may include activities such as content changes in the file (e.g., edits and deletions), sharing the file, renaming the file, comments within the file, messaging, and the like. In some examples, activities associated with the file may include activities that surround the file and may include activities such as conversations around the document (e.g., email communications and/or messaging communication that discuss and/or reference the file), and the like.

In some cases, the plurality of entities that may receive activity notifications from the notification service include at least client computing devices, storage platforms, web applications, email applications, and/or any third party entities that are independent of the notification service. For example, when an activity has occurred within a file (e.g., a user edits the file), the activity and/or activity metadata (e.g., a type of activity, an identifier, and a timestamp) corresponding to the edit may be sent/written to an activity service. In one example, the activity service may store the activity and/or activity metadata. The activity and/or activity metadata may be sent to the notification service. When the notification service receives the activity and/or activity metadata, the notification service may generate a notification from the activity and/or activity metadata. In one case, the file may be stored on a client computing device. In this case, the generated notification may be sent to the client computing device.

In some cases, the file may be stored on a first storage platform. In this regard, the file may be accessed by any number of client computing devices. For example, a user associated with the file may access the file using a mobile device such as a smartphone by logging-in to a user account associated with the first storage platform. In another example, a user associated with the file may access the file using a desktop device by logging-in to a user account associated with the first storage platform. In one case, a notification generated from the activity may be sent to the first storage platform. In another case, the notification generated from the activity may be sent to the client computing device (e.g., the mobile device and/or the desktop device). In this regard, the notification service may generate and send notifications from activities associated with a file regardless of where the file is stored. As such, the notification service may generate and send notifications from activities associated with a file independently of the file itself and its storage platform. A technical effect that may be appreciated is that the notification service of the present disclosure improves application and/or file collaboration by providing activity notifications for alerting a user of important activities that have occurred in and/or around a document (e.g., while the user is away from the document) independent of the applications/files themselves and the storage platforms hosting the applications/files.

As discussed above, current entities and/or storage providers that provide collaboration experiences require that applications, files, and/or metadata about the applications and/or files be stored on the entity's service and/or storage itself. That is, the file contents and the metadata about the file are both stored in the same location and tied to the entity service and/or storage provider. Notifications may be used to alert users about changes made to the documents by another user and/or co-author. However, the notifications regarding document changes are provided by the same entity service and/or storage provider that stores the document itself.

Accordingly, aspects described herein include a notification service for generating notifications from activities associated with a file independently of the files themselves and/or the storage platforms hosting the files. In this regard, one or more activities associated with a file stored on a first storage platform may be received at the notification service. A first notification from the one or more activities associated with the file stored on the first storage platform may be generated for alerting a user of the file of an occurrence of at least one of the one or more activities associated with the file. In another example, one or more activities associated with another file stored on a second storage platform may be received at the notification service. A second notification from the one or more activities associated with the another file stored on the second storage platform may be generated for alerting a user of the another file of an occurrence of at least one of the one or more activities associated with the another file. In one example, the first notification may be sent to an entity associated with the first storage platform. In another example, the second notification may be sent to an entity associated with the second storage platform.

In another aspect, one or more activities associated with a file may be received at the notification service. The notification service may determine which activities of the one or more activities meet a notification value threshold. The notification service may generate at least one notification from the activities determined to meet the notification value threshold. In one example, the notification may alert a user of the file of an occurrence of the activities determined to meet the notification value threshold. In some examples, one or more parameters associated with the file may be identified to determine which activities of the one or more activities meet the notification value threshold. The one or more parameters associated with the file may include at least one of a user state parameter, a user preference parameter, a user permission parameter, and a file activity parameter. In one case, the file may be stored on a client computing device. In another case, the file may be stored on a first storage platform. In yet another case, the file may be stored on a second storage platform. In this regard, the notification service may generate and send notifications from activities associated with a file independent of where the file is stored.

In other aspects, one or more entities associated with a user of a file may be identified. A priority level may be assigned to each of the one or more entities based on a type of activity of one or more activities associated with the file. The priority level may include at least a highest priority level and a lowest priority level. A notification indicating an occurrence of at least one activity from the one or more activities associated with the file may be sent to the entity assigned the highest priority level. In one example, the notification may include an action feature. The action feature may provide information to the notification service indicating that the notification was read and/or acted upon. For example, when a user selects the action feature of the notification, the notification service may receive an action receipt indicating that the notification was acted upon. The notification service may determine whether an action receipt has been received for the notification. When the notification service determines that the action receipt for the notification has not been received within a time period, the notification service may send the notification to an entity of the one or more identified entities assigned a second highest priority level. In some cases, the notification service may record a response pattern for the user of the file. For example, the notification service may observe which notifications a user reads and/or acts upon and which notifications a user does not read and/or act upon. Accordingly, another technical effect that may be appreciated is that the activity notifications are smartly and efficiently sent to entities such that a user may quickly and efficiently identify what happened to the document while they were away and any actions they may need to take in view of what happened while they were away. In turn, collaboration on documents may be accomplished in a faster and/or more efficient manner, ultimately reducing processor load, conserving memory, and reducing network bandwidth usage.

Referring now to the drawings, in which like numerals represent like elements through the several figures, aspects of the present disclosure and the exemplary operating environment will be described. With reference to FIG. 1, one aspect of a notification system 100 for generating notifications from activities associated with a file and identifying one or more entities to which the notifications should be sent is illustrated. In aspects, the notification system 100 may include a client computing device 104, a server computing device 106, an activity service 108, and a notification service 112. In a basic configuration, the client computing device 104 is a handheld computer having both input elements and output elements. The client computing device 104 may be any suitable computing device for implementing the notification system 100 for generating notifications from activities associated with a file and identifying one or more entities to which the notifications should be sent. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the notification system 100 for generating notifications from activities associated with a file and identifying one or more entities to which the notifications should be sent may be utilized.

In aspects, the server computing device 106 may provide data to and from the client computing device 104 and/or the activity service 108 through a network 105. In aspects, the notification system 100 may be implemented on more than one server computing device 106, such as a plurality of server computing devices 106. As discussed above, the server computing device 106 may provide data to and from the client computing device 104 and/or the activity service 108 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. The data may be communicated in accordance with various communication protocols, combinations of protocols, or variations thereof. In one example, the data may be communicated in accordance with the HTTPS (Secure Hypertext Transfer Protocol).

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the notification system 100 may include a client computing device 104, a server computing device 106, an activity service 108, and a notification service 112. The various components may be implemented using hardware, software, or a combination of hardware and software. The notification system 100 may be configured to generate notifications from activities associated with a file and identify one or more entities to which the notifications should be sent. In this regard, the activity service 108 may be configured to receive, store, create, generate, update, manage, and access data and/or information associated with the notification system 100. For example, the activity service 108 may receive, store, create, generate, update, and manage one or more activities associated with a file and/or activity metadata corresponding to the one or more activities associated with the file. In another example, the activity service 108 may provide access to the one or more activities associated with a file and/or activity metadata corresponding to the one or more activities associated with the file. In one case, the client computing device 104, the server computing device 106, and/or an application associated with the client computing device 104 and/or the server computing device 106 may access the activity service 108. In another example, the activity service 108 may send one or more activities and/or activity metadata to the notification service 112.

In one example, an application may include any application suitable for collaboration and/or co-authoring such as a word processing application, spreadsheet application, electronic slide presentation application, email application, chat application, voice application, and the like. In one case, a file associated with the application may include a word document, a spreadsheet, an electronic slide presentation, an email, a chat conversation, and the like. As such, an exemplary application may be an electronic slide presentation application. In this example, an exemplary file associated with the electronic slide presentation application may include an electronic slide presentation. As such, in one example, the notifications service 112 may generate notifications from one or more activities associated with the electronic slide application. In another example, the notification service 112 may identify which entity of a plurality of entities associated with a user of the electronic slide application to send the generated notification. It is appreciated that the notification service 112 may generate notifications from one or more activities associated with any number of files associated with any number of applications. It is further appreciated that the notification service 112 may identify which entity of a plurality of entities associated with a user of any number of files to send the generated notification.

In one example, the one or more activities may include both client side activities and server side activities. For example, the one or more activities may include activities associated with the client computing device 104 and activities associated with the server computing device 106. In one example, the one or more activities may include content changes, communication activities, document content exchanges, permission requests, sharing, printing, and the like. In aspects, the server computing device 106 is unaware of the one or more activities associated with the client computing device 104 and the client computing device 104 is unaware of the one or more activities associated with the server computing device 106. In one example, the one or more activities associated with the client computing device 104 may include messages, communication activities such as Instant Messaging and/or voice communications, comments, email activities, presentation of the file, printing the file, co-authoring the file, and the like. In one case, email activities may include sending an email, printing an email, and the like. In one example, the one or more activities associated with the server computing device 106 may include receiving a shared file, renaming a file, sharing a file, editing a file, restoring a file, and the like.

In aspects, the activity metadata may include at least an identifier, a timestamp, a type of activity, a location, and a link. In one case, the identifier may be an identifier of a user and/or co-author of the file. In one example, the identifier may indicate the user and/or co-author who performed an activity. In another example, the identifier may indicate a recipient of an activity. In one example, the timestamp may indicate a time at which the activity was performed. In another example, the timestamp may indicate an amount of time that has passed since an activity was performed. The type of activity may indicate the type of activity that occurred relative to the file such as any of the activities described herein. In one example, the location may indicate where the activity is located within a file and/or relative to a file. In one case, the link may provide access to the file associated with the activity. For example, if the activity is an email activity and a user/co-author is in an email application, upon receiving a selection of the link, the user/co-author may access the file associated with the email activity.

As illustrated in FIG. 1, the client computing device 104 includes a user interface component 110. In some examples, the user interface component 110 may be configured to display a file associated with an application and a file activity feed including one or more activities associated with the file, as described herein. In another example, the user interface component 110 may render a file stored on a storage platform. For example, the user interface component 110 may render any number of files stored on any number and/or type of storage platforms. In another example, the user interface component 110 may display one or more notifications received from the notification service 112. In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

In some aspects, the server computing device 106 may include a storage platform 130 and a data store 140. In one example, the storage platform 130 may be configured to store, manage, and access data and/or information associated with the notification system 100. For example, the storage platform 130 may store one or more files and/or one or more activities associated with a file in a data store 140. In another example, the data store 140 may include attribution information. In one case, attribution information may include information regarding the user/author performing an activity and/or a recipient of the plurality of activities. In one example, data store 140 may be part of and/or located at the storage platform 130. In another example, data store 140 may be a separate component and/or may be located separate from the storage platform 130. It is appreciated that although one server computing device 106 is illustrated in FIG. 1, the notification system 100 may include a plurality of server computing devices 106 with a plurality of storage platforms 130 and a plurality of data stores 140, which will be described in more detail relative to FIG. 2. In some cases, the server computing device 106 may include a plurality of storage platforms 130 and a plurality of data stores 140. For example, the plurality of storage platforms 130 may include at least file storage providers, external activity services and document editing clients. In one example, the storage platform 130 may be a cloud storage service such as OneDrive, SharePoint, Google Drive, Dropbox, and the like.

In aspects, the storage platform 130 may communicate with the client computing device 104 and/or the activity service 108. In this regard, the storage platform 130 may retrieve and/or obtain one or more activities associated with one or more files from the activity service 108. In one case, the storage platform 130 may retrieve and/or obtain activity metadata corresponding to the one or more activities from the activity service 108. In another case, the storage platform 130 may send activity metadata corresponding to one or more activities associated with one or more files to the activity service 108 for storage. In one example, a user of the client computing device 104 may create and/or access a first file. In one case, the first file is located on the client computing device 104. In another case, the first file is located on a first storage platform 130. A plurality of activities may be associated with the first file. The plurality of activities (and corresponding activity metadata) associated with the first file may be stored in the activity service 108. In one case, the client computing device 104 may obtain and/or retrieve the plurality of activities and corresponding activity metadata from the activity service 108 for display within a file activity feed of the first file on the client computing device 104. In another case, the first storage platform 130 may obtain and/or retrieve the plurality of activities and corresponding activity metadata from the activity service 108 for display within a file activity feed of the first file on the client computing device 104. In yet another case, the first storage platform 130 may obtain and/or retrieve the plurality of activities and corresponding activity metadata from the activity service 108 for providing analytics around the activity metadata and/or the plurality of activities associated with the first file.

In aspects, the notification service 112 may receive one or more activities associated with a file. For example, the one or more activities may have occurred in or to a file and/or may be stored in the activity service 108. The notification service 112 may be configured to determine which activities of the one or more received activities meet a notification value threshold. For example, when an activity is determined to have a high value and/or high importance, the activity may meet the notification value threshold. In this regard, in one example, the notification value threshold is the value at which an activity is deemed important enough for generating a notification from the activity. In one example, the notification value threshold may be set to a number of identified parameters associated with the file. In one example, when the notification value threshold is set to three parameters and the notification service 112 identifies at least three parameters associated with the file, the notification service 112 may determine that the activity meets the notification value threshold. In this regard, the notification service 112 may generate a notification from the activity that meets the notification value threshold. The examples described herein are exemplary only and should not be considered as limiting. For example, while a specified notification threshold value of three is described herein, it is appreciated that the notification threshold value may be set to any number of identified parameters associated with the file. Furthermore, the notification threshold value may be any value at which an activity is deemed important enough for generating a notification from the activity.

In some aspects, the notification service 112 may determine which activities of the one or more activities meet a notification value threshold by identifying one or more parameters associated with the file. In one example, the one or more parameters associated with the file include at least one of a user state parameter, a user preference parameter, a user permission parameter, and a file activity parameter. In some examples, a plurality of user state parameters, user preference parameters, user permission parameters, and file activity parameters may be identified. In one case, the user state parameter may indicate whether a user is present in the file. In this example, when the notification service 112 identifies that a user is present in the file, the notification service 112 may determine that an activity that occurs in the file does not meet the notification value threshold. In another case, another user state parameter may indicate that multiple files within an application are open. For example, a user may have two word documents open, but may be present in only one of the documents. In one implementation, when the notification service 112 identifies that a user has a first file open, but is present in a second file, if an activity occurs in the first file, the notification service 112 may determine that activity meets the notification value threshold. In this regard, the notification service 112 may generate a notification from the activity. In yet another case, the user state parameter may indicate the length of a working session in a file. For example, the length of the working session in a file may indicate whether a user is actively working within a file. In one example, when the notification service 112 identifies that a user has not been actively working within a file for a specific period of time (e.g., an hour), the notification service 112 may determine that an activity that occurs in the file meets the notification value threshold. In this regard, the notification service 112 may generate a notification from the activity.

In some aspects, the user preference parameter may include preferences set by a user of the file. For example, a user may indicate and set which activities are important and have high value to the user. In this regard, the notification service 112 may determine that those activities indicated as having a high value to the user meet the notification value threshold. As such, the notification service 112 may generate notifications for the activities indicated as having a high value in the user preferences.

In aspects, the user permission parameters may include file permissions associated with the user. For example, the user permission parameters may include edit rights, read-only rights, file creator, file ownership, and the like. In one example, when a user is the owner of the file, an activity of the type, "share," may be determined to meet the notification value threshold. In this regard, the notification service 112 may generate a notification from the share activity for a user who owns the file. In another example, when a user of the file only has read access to the file, an activity of the type, "share," may be determined to not meet the notification value threshold. In this regard, the notification service 112 may not generate a notification from the share activity for a user who only has read access to the file.

In aspects, the file activity parameters may include a number of synchronous and/or asynchronous co-authors in the file and a number of activities that have occurred in, to, and/or around the file within a specific period of time (e.g., mins, hours, days). In one example, when there are multiple co-authors collaborating within a file and multiple activities have occurred in and/or around the file in a short period of time (e.g., five minutes), the notification service 112 may determine that one or more of the activities that have occurred in and/or around the file in the short period of time meet the notification value threshold. In some examples, the notification service 112 may group notifications from a plurality of activities into a single notification. For example, using the example described above, when there are multiple co-authors collaborating within a file and multiple activities have occurred in and/or around the file in a short period of time, the notification service 112 may delay generating a notification for each activity that occurs in and/or around the file. In this regard, the notification service 112 may group the notifications generated for each activity that meets the notification value threshold into one notification. As such, users and/or co-authors of a file are not spammed and overwhelmed with notifications.

The examples described herein are exemplary only and should not be considered as limiting. For example, while various parameters for determining whether an activity meets the notification value threshold are described herein, it is appreciated that any number of parameters may be used and/or identified for determining whether an activity meets the notification value threshold. Furthermore, any combination of the parameters described herein may be identified and/or used to determine whether an activity meets the notification value threshold.

In aspects, the notification service 112 may be configured to identify one or more entities to which the notifications should be sent. In one example, the one or more entities may include at least one of a web application, an email application, and a client computing device (e.g., such as the client computing device 104). The client computing device 104 may include a mobile device and/or a desktop device, for example. In some cases, the notification service 112 may identify one or more entities associated with a user of the file. The one or more entities associated with a user of the file are the entities available to the notification service 112 for sending notifications from the one or more activities associated with the file. In some examples, the notification service 112 may assign a priority level to each entity of the one or more identified entities associated with a user of the file. The priority level assigned to the entities may be used to determine which entity to send the notification.

In one case, the priority level may be assigned to each entity based on a type of activity. For example, when the type of activity is a "share" (e.g., when a file is shared), a mobile device associated with a user of the file may be assigned a highest priority level. In this regard, a notification indicating that the file has been shared may be sent to the mobile device associated with the user. In some examples, the notification may include an action feature. The action feature may provide information to the notification service indicating whether the notification was read, opened, and/or acted upon. For example, when a user selects the action feature of the notification, the notification service may receive an action receipt indicating that the notification was acted upon. The notification may be read, opened, and/or acted upon by various actions including clicking on the notification and/or action feature, opening the file associated with the notification, hovering over the notification and/or action feature with a mouse, and the like. The notification service 112 may determine whether an action receipt has been received for a notification that has been sent. In this example, the notification service 112 determines whether an action receipt has been received for the notification from the share activity sent to the mobile device. When the notification service 112 determines that an action receipt for the notification has not been received within a period of time, the notification service 112 may send the notification to an entity associated with a user of the file assigned a second highest priority level. In this example, a second highest priority level may be assigned to an email application associated with the user of the file. As such, if the notification service 112 does not receive an action receipt after sending the notification to the mobile device within a period of time, the notification service 112 may send the notification via an email application associated with the user of the file. The period of time may be set to any amount of time determined by the notification service 112. For example, the period of time for sending another notification when an action receipt is not received may be set based on a variety of factors and/or parameters, as have been described herein.

In another case, a highest priority level may be assigned to more than one entity associated with a user of the file. For example, when the activity type is a @mention activity on a comment thread, both a mobile device and an email application associated with the user @mentioned may be assigned a highest priority level. In this regard, a notification indicating that the user has been @mentioned in a comment thread may be sent to the mobile device and an email application associated with the @mentioned user.

In another case, the priority level may be assigned to each entity based on registration methods. For example, a user may create an account associated with an application (e.g., a word processing application) installed on a device associated with the user. In this regard, when the user logs-in to her account associated with the application, the notification service 112 may receive a registration notice. When the notification service 112 receives the registration notice, the notification service 112 may determine that this entity (e.g., the device the user is using to access the application) is live and may assign a highest priority level to this device.

In another case, the priority level may be assigned to each entity based on entity preferences. For example, the storage platform that hosts and stores a file may set notification preferences. In one example, the notification preferences may be set to turn on and off notifications. In another example, the notification preferences may be set based on a type of activity. For example, the notification preferences may indicate the type of activities for which a notification is generated and the entity that should receive the notification. In this regard, an entity set in the notification preferences for receiving a notification when a particular type of activity has occurred, may be assigned a highest priority level. It is appreciated that the priority level may be assigned to each entity based on combination of factors including those described herein such as the type of activity, registration methods, and entity preferences.

The priority level includes at least a highest priority level and a lowest priority level. The priority level may include a second highest priority level, a third highest priority level, and/or any number of highest priority levels and lowest priority levels. In one example, a notification generated from an activity may be sent to an entity assigned the highest priority level. In another example, a notification generated from an activity may be sent to an entity assigned a second highest priority level. For example, as described herein, when the notification service 112 does not receive an action receipt within a period of time after sending a notification to an entity assigned a highest priority level, the notification may be sent to an entity assigned a second highest priority level. In yet another example, a notification generated from an activity may be sent to an entity assigned a third highest priority level. In one case, the notification generated from the activity may be sent to an entity assigned a third highest priority level when an action receipt has not been received within a period of time after sending the notification to an entity assigned a first highest priority level and an entity assigned a second highest priority level.

In some cases, the notification service 112 may record a response pattern for a user of the file. For example, a user may have a pattern of reading, acting upon, selecting notifications received via an email application associated with the user. The user may also have a pattern of not reading, acting upon, selecting notifications received via a web application associated with the user. In this case, the notification service 112 may record these response patterns of the user. In this regard, over time, the notification service 112 may assign a high priority level to the email application associated with the user. As such, the notification service 112 may send notifications to this particular user via the email application often.

Figure 2:
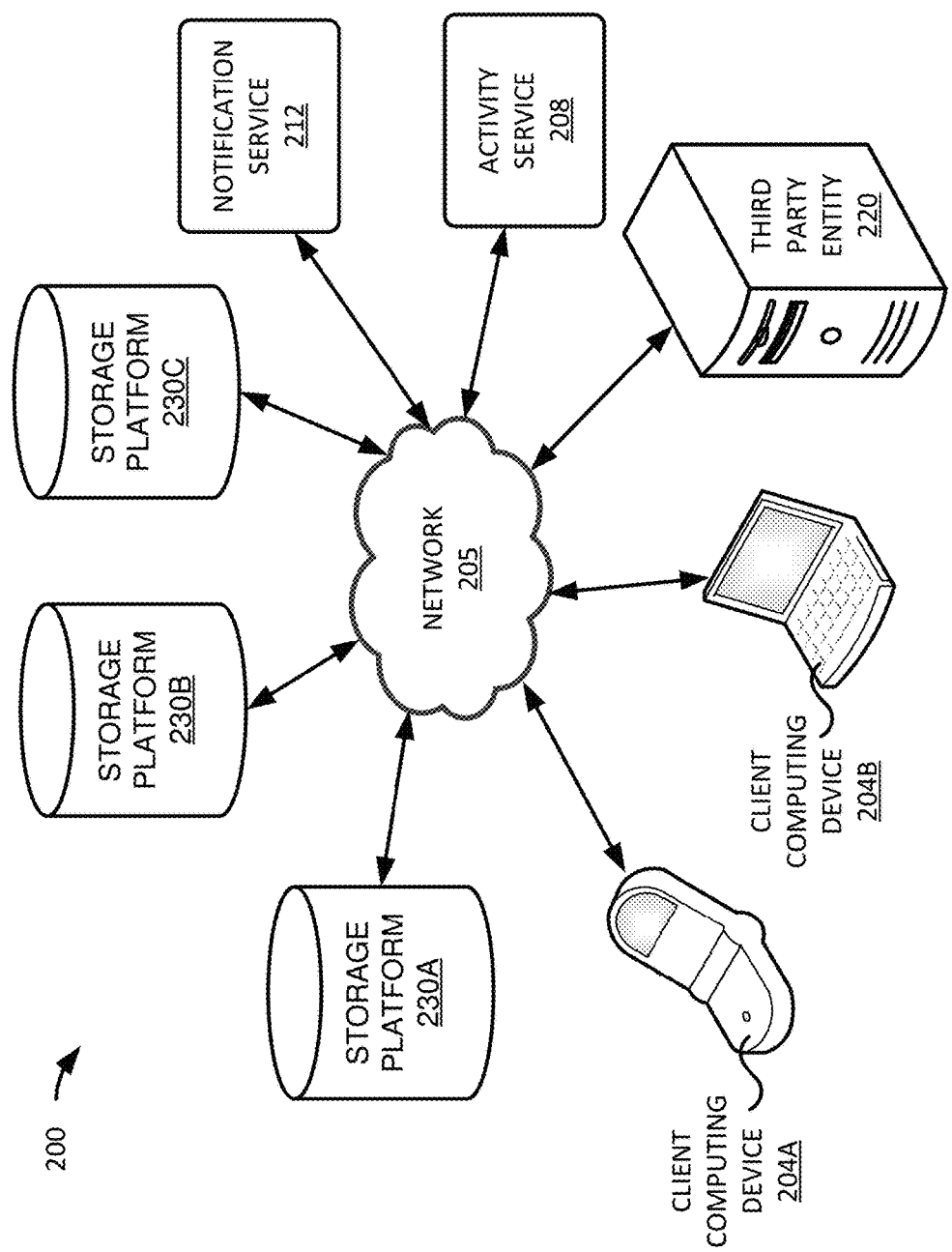
FIG. 2 illustrates an exemplary notification system, according to an example aspect.

Referring now to FIG. 2, one aspect of a notification system 200 for generating notifications from activities associated with a file and identifying one or more entities to which the notifications should be sent is illustrated. In aspects, the notification system 200 may include client computing devices 204A-204B, an activity service 208, a notification service 212, a third party entity 220, and a storage platforms 230A-230C. Similar to the client computing device 104 discussed above herein relative to FIG. 1, the client computing devices 204A-204B may be a handheld computer having both input elements and output elements. The client computing devices 204A-204B may be any suitable computing device for implementing the notification system 200 for generating notifications from activities associated with a file and identifying one or more entities to which the notifications should be sent. For example, the client computing devices 204A-204B include, but are not limited to a mobile telephone, a smart phone (e.g., 204A) a tablet, a phablet, a smart watch, a wearable computer, a personal computer, a desktop computer, a laptop computer (e.g., 204B) a gaming device/computer (e.g., Xbox), a television, and etc. This list is exemplary only and should not be considered as limiting. Any suitable client computing devices 204A-204B for implementing the notification system 200 for generating notifications from activities associated with a file and identifying one or more entities to which the notifications should be sent may be utilized.

In aspects, the client computing devices 204A-204B may be connected via a network 205. In this regard, the client computing devices 204A-204B may provide data to and from the activity service 208, the notification service 212, the third party entity 220, and/or the storage platforms 230A-230C through the network 205. The third party entity 220 may provide data to and from the activity service 208, the notification service 212, the client computing devices 204A-204B, and/or the storage platforms 230A-230C through the network 105. The storage platforms 230A-230C may provide data to and from the client computing devices 204A-204B, the activity service 208, the notification service 212, and/or the third party entity 220 through the network 205. The activity service 208 may provide data to and from the notification service 212, the client computing devices 204A-204B, the storage platforms 230A-230C, and/or the third party entity 220 through the network 205. The notification service 212 may provide data to and from the activity service 208, the client computing devices 204A-204B, the storage platforms 230A-230C, and/or the third party entity 220 through the network 205. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. The data may be communicated in accordance with various communication protocols, combinations of protocols, or variations thereof. In one example, the data may be communicated in accordance with the HTTPS (Secure Hypertext Transfer Protocol).

In one aspect, similar to the notification system 100 of FIG. 1, the notification system 200 may include an activity service 208, a notification service 212, and storage platforms 230A-230C. In this regard, the activity service 208, the notification service 212, and storage platforms 230A-230C may have the same functionality and/or features as the activity service 108, the notification service 112, and storage platform 130 described herein relative to FIG. 1. The third party entity 220 may include any entity capable of providing a cloud connected storage platform agnostic file authoring, collaboration solution. For example, the third party entity 220 may include entities such as social media, academics and/or universities, file/document processing tools, content reading and/or converting software, any service and/or component that generates interesting information around a file, and the like. It is appreciated that while the notification system 200 illustrates the third party entity 220, any number of third party entities may be implemented within the notification system 200.

In one aspect, an indication of an occurrence of at least one activity associated with a file (e.g., a first file) may be received. For example, an author may open a file on the client computing device 204A. In one case, the file may be a word document associated with a word processing application. In one example, the word processing application is a Microsoft Office word processing application. The author may make an edit to the file and/or print the file, for example. In this regard, an indication of the occurrence of the edit and/or printing may be received at the client computing device 204A. The client computing device 204A may generate activity metadata corresponding to the edit and/or printing activities. For example, the generated activity metadata may include data such as an author identifier indicating who edited and/or printed the file, a time at which the file was edited and/or printed, the type of activity (e.g., editing and/or printing), and the like. The client computing device 204A may send the generated activity metadata and/or the edit and printing activities to the activity service 208 via the network 205 for storing the generated activity metadata and/or editing and printing activities. In this regard, the activity service 208 may receive the activity metadata corresponding to the editing and/or printing activities associated with the file and store the activity metadata. In the described example, the file (and the file contents) is stored at the client computing device 204A and the activity metadata associated with the file is stored at the storage service 208. The notification service 212 may receive the activity metadata and/or editing and printing activities. The notification service 212 may determine whether the editing and/or printing activities meet a notification value threshold using the techniques described herein. The notification service 212 may generate at least one notification when either or both of the editing and/or printing activities meet the notification value threshold. In one example, the notification service 212 may send the generated notification to an entity assigned a highest priority level. In this example, the notification service 212 may send the generated notification to the client computing device 204A.

In one example, the file opened on the client computing device 204A may be stored on the storage platform 230A. In one example, the storage platform 230A may be a storage platform such as OneDrive. In this regard, an indication of the occurrence of the edit and/or printing may be received at the storage platform 230A. The storage platform 230A may generate activity metadata corresponding to the edit and/or printing activities. The storage platform 230A may send the generated activity metadata and/or editing and printing activities to the activity service 208 via the network 205 for storing the generated activity metadata and/or editing and printing activities. In the described example, the file (and the file contents) is stored at storage platform 230A and the activity metadata and/or the editing and printing activities associated with the file are stored at the storage service 208. The notification service 212 may receive the activity metadata and/or editing and printing activities. The notification service 212 may determine whether the editing and/or printing activities meet a notification value threshold using the techniques described herein. The notification service 212 may generate at least one notification when either or both of the editing and/or printing activities meet the notification value threshold. In one example, the notification service 212 may send the generated notification to an entity assigned a highest priority level. In this example, the notification service 212 may send the generated notification to the client computing device 204A. In this regard, the notification service may generate and send notifications from activities associated with a file independently of the file itself and its storage platform. That is, the file is stored at storage platform 230A and a notification is sent to the client computing device 204A.

In another aspect, the file stored on the storage platform 230A may be rendered on a user interface of the client computing device 204B. The client computing device 204B may obtain one or more activities including corresponding activity metadata associated with the file from the activity service 208. For example, the client computing device 204B may obtain the edit and/or printing activities including corresponding activity metadata that occurred to the file (e.g., as described above herein). In this regard, a co-author of the file (e.g., a user of the client computing device 204B) may be informed of the activities that have occurred to the file by another co-author. In one example, the activities (e.g., the edit and/or printing activities) and corresponding activity metadata may be displayed within a file activity feed of the file. In one case, the notification service 212 may send the generated notification to the client computing device 204B. In this regard, a co-author of the file (e.g., a user of the client computing device 204B) may receive a notification from activities that have occurred to the file by another co-author.

In one aspect, an indication of an occurrence of at least one activity associated with another file (e.g., a second file) may be received. For example, an author may open another file on the client computing device 204A. In one case, the file may be a spreadsheet associated with a spreadsheet application. In one example, the spreadsheet application is a Microsoft Office spreadsheet application such as Excel. The author may make a comment on the file and/or rename the file, for example. In this regard, an indication of the occurrence of the comment and/or renaming of the second file may be received at the client computing device 204A. The client computing device 204A may generate activity metadata corresponding to the comment and/or renaming of the second file activities. For example, the generated activity metadata may include data such as an author identifier indicating who commented and/or renamed the second file, a time at which the second file was renamed and/or a time at which the comment was made, the type of activity (e.g., commenting and/or renaming), and the like. The client computing device 204A may send the generated activity metadata and/or commenting and renaming activities to the activity service 208 via the network 205 for storing the generated activity metadata and/or commenting and renaming activities. In this regard, the activity service 208 may receive the activity metadata corresponding to the commenting and/or renaming activities associated with the second file and store the activity metadata. In the described example, the second file (and the second file contents) is stored at the client computing device 204A and the activity metadata associated with the second file is stored at the storage service 208. The notification service 212 may receive the activity metadata and/or commenting and renaming activities. The notification service 212 may determine whether the commenting and renaming activities meet a notification value threshold using the techniques described herein. The notification service 212 may generate at least one notification when either or both of the commenting and renaming activities meet the notification value threshold. In one example, the notification service 212 may send the generated notification to an entity assigned a highest priority level. In this example, the notification service 212 may send the generated notification to an email application associated with the author of the second file.

In one example, the second file opened on the client computing device 204A may be stored on the storage platform 230B. In one example, the storage platform 230B may be a storage platform such as Dropbox. In this regard, an indication of the occurrence of the comment and/or renaming the second file may be received at the storage platform 230B. The storage platform 230B may generate activity metadata corresponding to the comment and/or renaming activities. The storage platform 230B may send the generated activity metadata and/or commenting and renaming activities to the activity service 208 via the network 205 for storing the generated activity metadata. In the described example, the second file (and the second file contents) is stored at storage platform 230B and the activity metadata and commenting and renaming activities associated with the second file are stored at the storage service 208. The notification service 212 may receive the activity metadata and/or commenting and renaming activities. The notification service 212 may determine whether the commenting and/or renaming activities meet a notification value threshold using the techniques described herein. The notification service 212 may generate at least one notification when either or both of the commenting and/or renaming activities meet the notification value threshold. In one example, the notification service 212 may send the generated notification to an entity assigned a highest priority level. In this example, the notification service 212 may send the generated notification to an email application associated with the author of the second file. In this regard, the notification service may generate and send notifications from activities associated with a file independently of the file itself and its storage platform.

In another aspect, the second file stored on the storage platform 230B may be rendered on a user interface of the client computing device 204B. The client computing device 204B may obtain one or more activities associated with the second file from the activity service 208. The one or more activities may include corresponding activity metadata. For example, the client computing device 204B may obtain the comment and/or renaming activities including corresponding activity metadata that occurred to the second file (e.g., as described above herein). In this regard, a co-author of the second file (e.g., a user of the client computing device 204B) may be informed of the activities that have occurred to the second file by another co-author. In one example, the activities (e.g., the comment and/or renaming activities) and corresponding metadata may be displayed within a file activity feed of the second file. In one case, the notification service 212 may send the generated notification to the client computing device 204B. In this regard, a co-author of the second file (e.g., a user of the client computing device 204B) may receive a notification from activities that have occurred to the second file by another co-author.

In one aspect, an indication of an occurrence of at least one activity associated with another file (e.g., a third file) may be received. For example, an author may open a third file on the client computing device 204A. In one case, the third file may be an electronic slide presentation associated with an electronic slide presentation application. In one example, the electronic slide presentation application is a Microsoft Office electronic slide presentation application such as PowerPoint. The author may present the third file and/or mention the third file in an email, for example. In this regard, an indication of the occurrence of the presentation and/or email may be received at the client computing device 204A. The client computing device 204A may generate activity metadata corresponding to the presentation and/or email activities. For example, the generated activity metadata may include data such as an author identifier indicating who presented and/or mentioned the third file in an email, a time at which the third file was presented and/or mentioned in the email, the type of activity (e.g., presenting and/or emailing), and the like. The client computing device 204A may send the generated activity metadata and/or the presentation and email activities to the activity service 208 via the network 205 for storing the generated activity metadata and/or the presentation and email activities. In this regard, the activity service 208 may receive the activity metadata corresponding to the presentation and/or email activities associated with the third file and store the activity metadata. In the described example, the third file (and the third file contents) is stored at the client computing device 204A and the activity metadata associated with the third file is stored at the storage service 208. The notification service 212 may receive the activity metadata and/or editing and printing activities. The notification service 212 may determine whether the presentation and/or email activities meet a notification value threshold using the techniques described herein. The notification service 212 may generate at least one notification when either or both of the presentation and/or email activities meet the notification value threshold. In one example, the notification service 212 may send the generated notification to an entity assigned a highest priority level. In this example, the notification service 212 may send the generated notification to a web application.

In one example, the third file opened on the client computing device 204A may be stored on the storage platform 230C. In one example, the storage platform 230C may be a storage platform such as SharePoint. In this regard, an indication of the occurrence of the presentation and/or email may be received at the storage platform 230C. The storage platform 230C may generate activity metadata corresponding to the presentation and/or email activities. The storage platform 230C may send the generated activity metadata and/or presentation and email activities to the activity service 208 via the network 205 for storing the generated activity metadata and/or presentation and email activities. In the described example, the third file (and the third file contents) is stored at storage platform 230C and the activity metadata associated with the third file is stored at the storage service 208. The notification service 212 may receive the activity metadata and/or presentation and email activities. The notification service 212 may determine whether the presentation and/or email activities meet a notification value threshold using the techniques described herein. The notification service 212 may generate at least one notification when either or both of the presentation and/or email activities meet the notification value threshold. In one example, the notification service 212 may send the generated notification to an entity assigned a highest priority level. In this example, the notification service 212 may send the generated notification to a web application. In this regard, the notification service may generate and send notifications from activities associated with a file independently of the file itself and its storage platform.

In another aspect, the third file stored on the storage platform 230C may be rendered on a user interface of the client computing device 204B. The client computing device 204B may obtain one or more activities associated with the third file from the activity service 208. For example, the client computing device 204B may obtain the presentation and/or email activities and corresponding activity metadata that occurred to the third file (e.g., as described above herein). In this regard, a co-author of the third file (e.g., a user of the client computing device 204B) may be informed of the activities that have occurred to the third file by another co-author. In one example, the activities (e.g., the presentation and/or email activities) and corresponding metadata may be displayed within a file activity feed of the third file. In one case, the notification service 212 may send the generated notification to the client computing device 204B. In this regard, a co-author of the third file (e.g., a user of the client computing device 204B) may receive a notification from activities that have occurred to the third file by another co-author.

In one aspect, the notification service 212 may generate notifications from one or more activities associated with a file stored on any of the storage platforms 230A-230C. For example, the notification service 212 may generate notifications from one or more activities associated with a file stored on storage platform 230A (e.g., a first storage platform). In another example, the notification service 212 may generate notifications from one or more activities associated with a file stored on the storage platform 230B (e.g., a second storage platform). In yet another example, the notification service 212 may generate notifications from one or more activities associated with a file stored on the storage platform 230C (e.g., a third storage platform).

It is appreciated that while FIG. 2 illustrates client computing devices 204A-204B, activity service 208, notification service 212, third party entity 220, and storage platforms 230A-230C of the notification system 200, the discussion of client computing devices 204A-204B, activity service 208, notification service 212, third party entity 220, and storage platforms 230A-230C and the notification system 200 is exemplary only and should not be considered as limiting. Any suitable number and/or type of client computing devices, storage platforms, and third party entities may generate activity metadata corresponding to one or more activities associated with any number of files and communicate with the activity service 208 (e.g., send to, write to, read from, receive from, consume) and/or the notification service 212 such that users/co-authors may be receive notifications from activities independently of the file associated with the activities, the content of the file associated with the activities, and/or the storage platforms hosting the files associated with the activities. Furthermore, while the present disclosure discusses the word processing application, the spreadsheet application, and the electronic slide application, the first file, the second file, the third file, the first storage platform, the second storage platform, the third storage platform, the first client computing device, the second client computing device, and the third party entity, this is only exemplary and should not be considered limiting. Any number of applications, files, storage platforms, client computing devices, and/or third party entities may be utilized in conjunction with the present disclosure.

Figure 3:
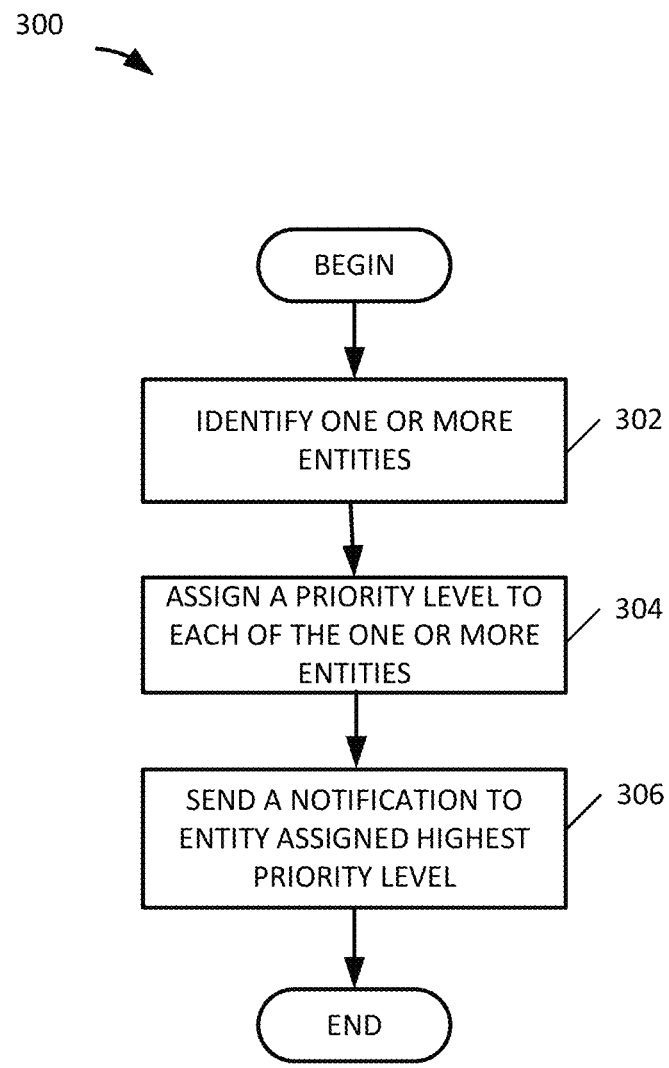
FIG. 3 illustrates an exemplary method for sending a notification to an entity, according to an example aspect.

Referring now to FIG. 3, an exemplary method 300 for sending a notification to an entity, according to an example aspect is shown. Method 300 may be implemented on a computing device or a similar electronic device capable of executing instructions through at least one processor. Method 300 may begin at operation 302, where one or more entities associated with a user of a file may be identified. In one example, the one or more entities may include at least one of a web application, an email application, and a client computing device. The client computing device may include a mobile device and/or a desktop device, for example. The one or more entities associated with a user of the file are the entities available to a notification service for sending notifications from the one or more activities associated with the file.

When one or more entities associated with a user of a file is identified, flow proceeds to operation 304 where a priority level is assigned to each of the one or more entities. In one example, the priority level is assigned to each of the one or more entities based on a type of activity of the one or more activities associated with the file. The type of activity may indicate the type of activity that occurred relative to the file such as any of the activities described herein. The priority level may include at least a highest priority level and a lowest priority level. The priority level may include a second highest priority level, a third highest priority level, and/or any number of highest priority levels and lowest priority levels.

When a priority level is assigned to each of the one or more entities, flow proceeds to operation 306 where a notification indicating an occurrence of at least one activity from the one or more activities associated with the file is sent to the entity of the one or more identified entities assigned the highest priority level. In another example, a notification generated from an activity may be sent to an entity assigned a second highest priority level. For example, when the notification service does not receive an action receipt within a period of time after sending a notification to an entity assigned a highest priority level, the notification may be sent to an entity assigned a second highest priority level. In yet another example, a notification generated from an activity may be sent to an entity assigned a third highest priority level. In one case, the notification generated from the activity may be sent to an entity assigned a third highest priority level when an action receipt has not been received within a period of time after sending the notification to an entity assigned a first highest priority level and an entity assigned a second highest priority level.

Figure 4:
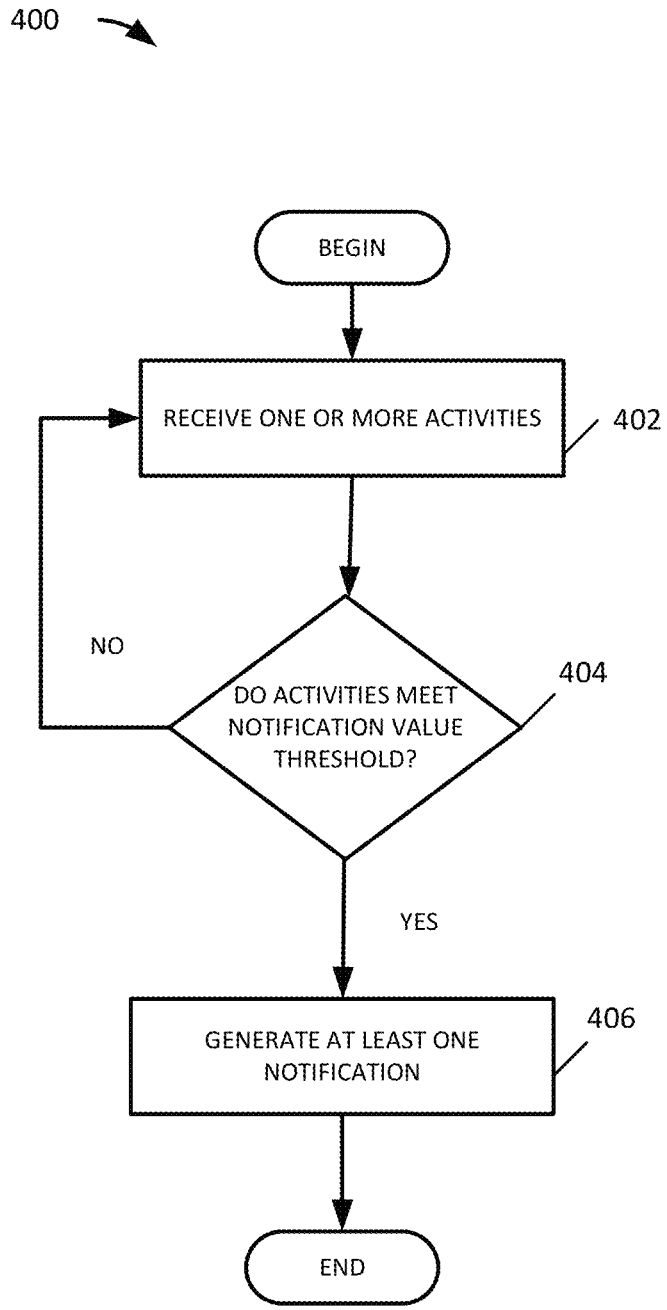
FIG. 4 illustrates an exemplary method for generating a notification from one more activities, according to an example aspect.

Referring now to FIG. 4, an exemplary method 400 for generating a notification from one more activities, according to an example aspect is shown. Method 400 may be implemented on a computing device or a similar electronic device capable of executing instructions through at least one processor. Method 400 begins at operation 402 where one or more activities associated with a file may be received. For example, one or more activities may occur in, to, and/or around a file stored on any number of devices and/or storage platforms. The one more activities may be stored in an activity service. The one or more activities may be sent to and received at a notification service. In one example, the one or more activities may include both client side activities and server side activities. In one example, the one or more activities may include content changes, communication activities, document content exchanges, permission requests, sharing, printing, and the like. In another example, the one or more activities may include messages, communication activities such as Instant Messaging and/or voice communications, comments, email activities, presentation of the file, printing the file, co-authoring the file, and the like. In one example, the one or more activities may include receiving a shared file, renaming a file, sharing a file, editing a file, restoring a file, and the like.

When one or more activities associated with a file are received, flow proceeds to decision operation 404 where it is determined which activities of the one or more activities meet a notification value threshold. For example, when an activity is determined to have a high value and/or high importance, the activity may meet the notification value threshold. In this regard, in one example, the notification value threshold is the value at which an activity is deemed important enough for generating a notification from the activity. The notification service may determine which activities of the one or more activities meet a notification value threshold by identifying one or more parameters associated with the file. In one example, the one or more parameters associated with the file include at least one of a user state parameter, a user preference parameter, a user permission parameter, and a file activity parameter. In some examples, a plurality of user state parameters, user preference parameters, user permission parameters, and file activity parameters may be identified.

When it is determined which activities of the one or more activities meet a notification value threshold (e.g., when it is determined that at least one activity of the one or more activities meet a notification value threshold), flow proceeds to operation 406 where at least one notification is generated from the activities determined to meet the notification value threshold. When at least one notification is generated from the activities determined to meet the notification value threshold, one or more entities may be identified to determine where to send the at least one generated notification. In one example, the entity to which the notification is sent is based on a priority level assigned to the entity. In one case, the generated notification is sent to an entity of the one or more identified entities that is assigned a highest priority level. When it is determined that no activities of the one or more activities meet a notification threshold, flow proceeds back to operation 402 where one or more activities associated with a filed may be received.

Figure 5:
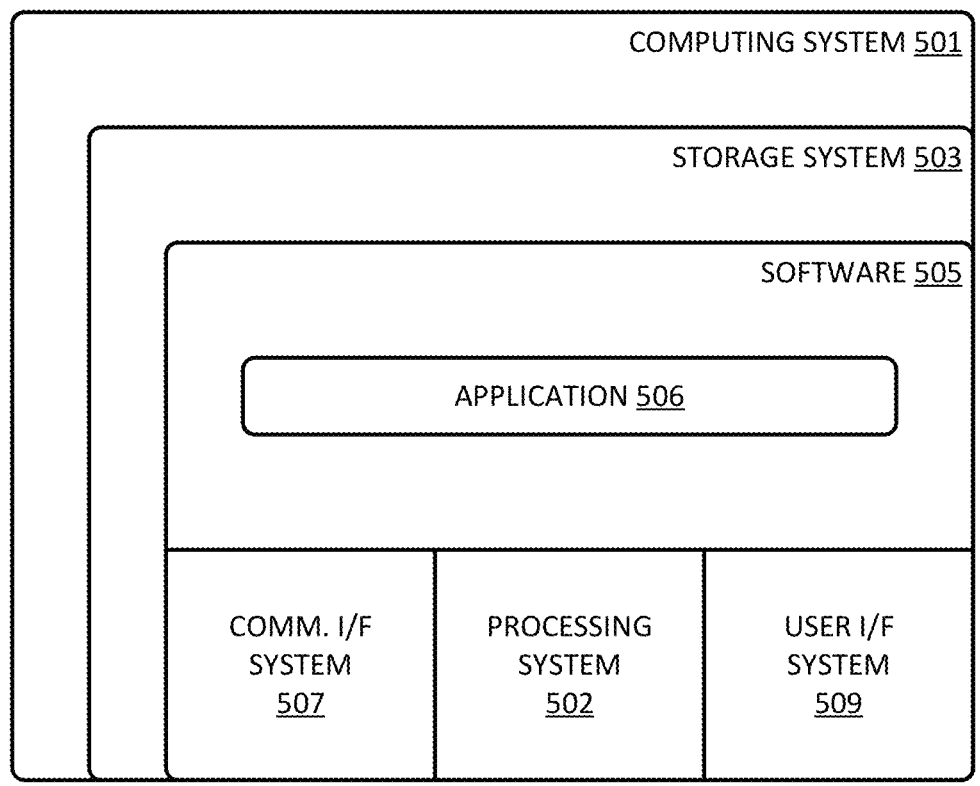
FIG. 5 illustrates a computing system suitable for implementing the enhanced notification service technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes application 506, which is representative of the applications discussed with respect to the preceding FIGS. 1-4, including electronic slide applications and word processing applications described herein. When executed by processing system 502 to enhance notification services, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced unified notification services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include application 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced notification services. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Techniques for generating and delivering notifications are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of notification services that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
    at least one processor; and
    memory encoding computer executable instructions that, when executed by the at least one processor, perform a method for sending a notification to an entity, the method comprising:
        identifying one or more entities associated with a user of a file;
        assigning a priority level to each of the one or more entities based on a type of activity of one or more activities associated with the file to determine which entity of the one or more entities to send a notification, wherein the priority level includes at least a highest priority level and a lowest priority level, and wherein the one or more entities include at least one of a web application, an email application, a storage platform, and a client computing device;
        when the type of activity is a first type of activity, sending a notification indicating an occurrence of a first activity from the one or more activities associated with the file to an entity of the one or more identified entities assigned the highest priority level; and
        when the type of activity is a second type of activity, sending a notification indicating an occurrence of a second activity from the one or more activities associated with the file to more than one entity of the one or more identified entities assigned the highest priority level.

2. The system of claim 1, wherein the notification alerts a user of the file of an occurrence of at least one activity from the one or more activities associated with the file.

3. The system of claim 1, wherein the notification includes an action feature.

4. The system of claim 3, further comprising receiving an action receipt when the action feature is selected.

5. The system of claim 1, further comprising determining whether an action receipt has been received for the notification.

6. The system of claim 5, further comprising when it is determined that the action receipt for the notification has not been received within a time period, sending the notification to an entity of the one or more identified entities assigned a second highest priority level.

7. The system of claim 1, further comprising recording a response pattern for the user of the file.

8. A computer-implemented method for generating a notification from one or more activities, the method comprising:
    receiving one or more activities associated with a file;
    calculating a notification value threshold using one or more parameters associated with the file;
    executing generation logic via the notification service to determine which activities of the one or more activities meet the notification value threshold;
    for the activities of the one or more activities determined to meet the notification value threshold:
        generating a notification;
        calculating a duration of time between each activity; and
        when the duration of time between two or more activities is less than a predetermined threshold, grouping the notifications for the two or more activities into a single notification;
    when the two or more activities are a first type of activity, sending the single notification to an entity assigned a highest priority level; and
    when the two or more activities are a second type of activity, sending the single notification to more than one entity assigned the highest priority level.

9. The computer-implemented method of claim 8, wherein the notification alerts a user of the file of an occurrence of the activities determined to meet the notification value threshold.

10. The computer-implemented method of claim 8, wherein determining which activities of the one or more activities meet a notification value threshold comprises identifying the one or more parameters associated with the file.

11. The computer-implemented method of claim 10, wherein the one or more parameters associated with the file include at least one of a user state parameter, a user preference parameter, a user permission parameter, and a file activity parameter.

12. The computer-implemented method of claim 8, wherein the file is stored on a client computing device.

13. The computer-implemented method of claim 8, wherein the file is stored on a first storage platform.

14. The computer-implemented method of claim 8, wherein the file is stored on a second storage platform.

15. The computer-implemented method of claim 8, wherein the entities include at least one of a web application, an email application, a storage platform, and a client computing device.

16. The computer-implemented method of claim 13, wherein the entity assigned the highest priority level is associated with the first storage platform.

17. The computer-implemented method of claim 14, wherein the entity assigned the highest priority level is associated with the second storage platform.

18. A system comprising:
one or more non-transitory computer readable storage media; and
program instructions stored on the one or more non-transitory computer readable storage media that, when executed by at least one processor, cause the at least one processor to at least:
receive, at a notification service, one or more activities associated with a file stored on a first server of a plurality of servers maintained by a first cloud storage provider;
generate, via the notification service, a first notification from the one or more activities associated with the file stored on the first server of the plurality of servers maintained by the first cloud storage provider for alerting a user of the file of an occurrence of at least one of the one or more activities associated with the file;
receive, at the notification service, one or more activities associated with another file stored on a first server of a plurality of servers maintained by a second cloud storage provider; and
generate, via the notification service, a second notification from the one or more activities associated with the another file stored on the first server of the plurality of servers maintained by the second cloud storage provider for alerting a user of the another file of an occurrence of at least one of the one or more activities associated with the another file.

19. The system of claim 18, further comprising sending the first notification to an entity associated with the first cloud storage provider.

20. The system of claim 18, further comprising sending the second notification to an entity associated with the second cloud storage provider.

* * * * *